United States Patent [19]

Miyauchi

[11] Patent Number: 4,930,880

[45] Date of Patent: Jun. 5, 1990

[54] GRADED REFRACTIVE INDEX LENS

[75] Inventor: Yuji Miyauchi, Kanagawa, Japan

[73] Assignee: Olympus Optical Co., Ltd., Tokyo, Japan

[21] Appl. No.: 418,323

[22] Filed: Oct. 6, 1989

[30] Foreign Application Priority Data

Oct. 11, 1988 [JP] Japan .............................. 63-253896

[51] Int. Cl.$^5$ ............................................... G02B 3/00
[52] U.S. Cl. .................................... 350/413; 350/423; 350/464
[58] Field of Search ........................ 350/413, 423, 464

[56] References Cited

U.S. PATENT DOCUMENTS 4,702,568  10/1987  Okudaira .............................. 350/464
4,721,369   1/1988  Hattori et al. ....................... 350/413

FOREIGN PATENT DOCUMENTS 61-176905  8/1986  Japan .
62-50808   3/1987  Japan .

Primary Examiner—Rodney B. Bovernick
Assistant Examiner—Rebecca D. Gass
Attorney, Agent, or Firm—Cushman, Darby & Cushman

[57] ABSTRACT

A graded refractive index lens having refractive index distribution in the direction along the optical axis, a meniscus shape and a capability to correct aberrations, especially chromatic aberration.

5 Claims, 5 Drawing Sheets

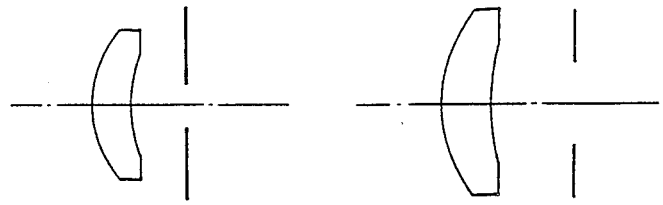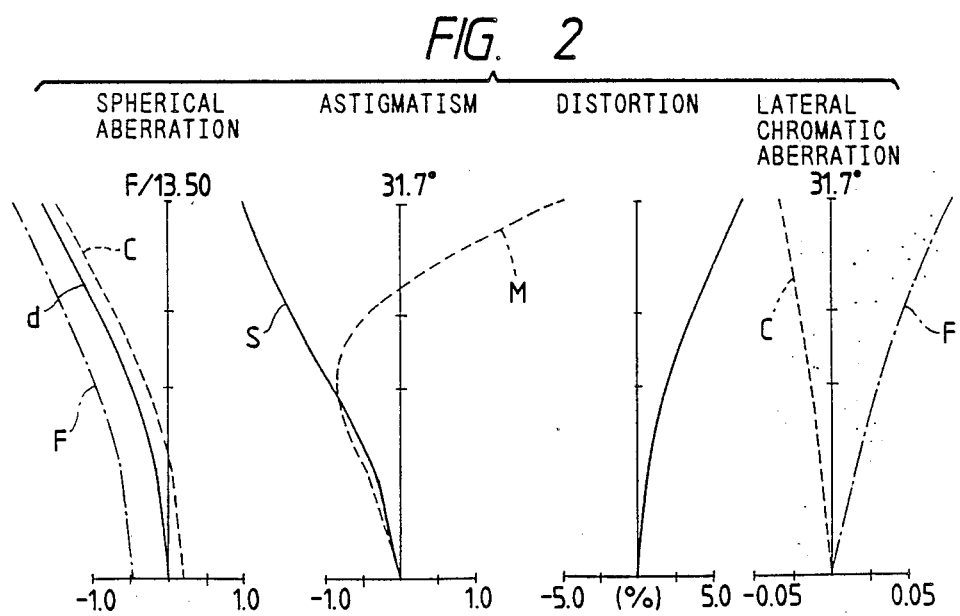

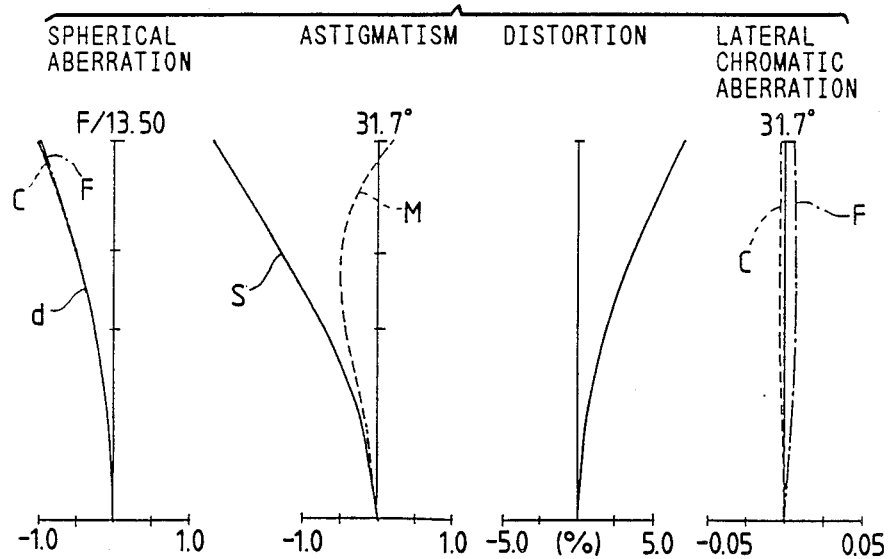
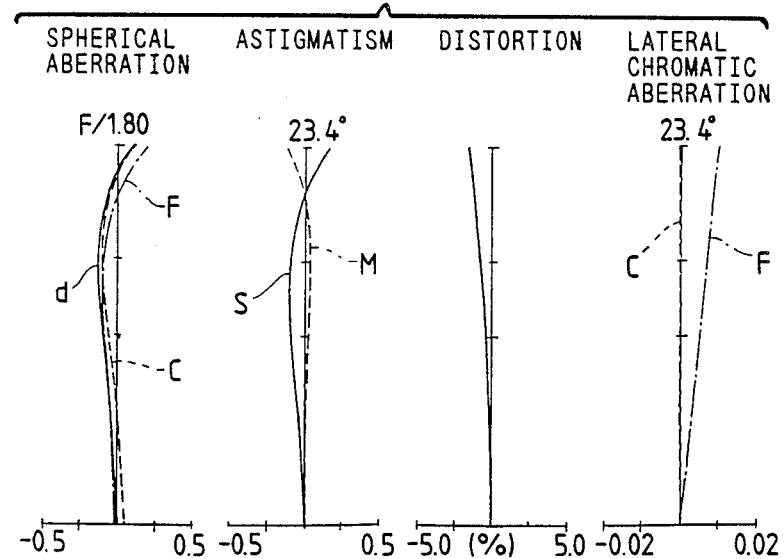

GRADED REFRACTIVE INDEX LENS

BACKGROUND OF THE INVENTION 1 (a). Field of the Invention

The present invention relates to a graded refractive index lens having refractive index distribution in the direction along the optical axis.

2. (b). Description of the Prior Art

In the recent years, it is conceived to use graded refractive index lenses in various types of lens systems.

The graded refractive index lenses are classified roughly into the radial GRIN lens having refractive index distribution in the radial direction perpendicular to the optical axis and the axial GRIN lens having refractive index distribution in the direction along the optical axis. Out of these GRIN lenses, the axial GRIN lens can have a function similar to that of an aspherical surface simply by forming a spherical surface on the axial GRIN lens. Japanese Unexamined Published Patent Application No. 176905/61 discloses an axial GRIN lens which is used for correcting curvature of field. However, it is generally considered that the aberration correcting capability of the axial GRIN lens is lower than that of the radial GRIN lens. Especially, it is considered that the axial GRIN lens has no capability to correct chromatic aberration. See Applied Optics Vol. 21, No. 6, pages 993 to 998.

Out of optical systems, the simplest system consists of a single lens component. It is impossible to correct chromatic aberration with a single homogeneous lens component and, in order to correct chromatic aberration with an optical system consisting only of homogeneous lens components, it is necessary to combine at least two lens components.

FIG. 1 shows an example of the conventional imaging lens system consisting only of a single homogeneous lens component. This conventional lens system is designed with the numerical data listed below:

---
$r^1 = 5.5692$
$\quad d_1 = 1.8861 \quad n_1 = 1.49216 \quad \nu_1 = 57.5$
$r^2 = 7.3108$ (aspherical surface)
$\quad d_2 = 2.7943$
$r^3 = \infty$ (stop)

aspherical surface coefficients $P = 1.0945, B = 0,$
$F = 0.52385 \times 10^{-4},$
$H = -0.11399 \times 10^{-6},$
$J = 0.12698 \times 10^{-8},$ $E = -0.33201 \times 10^{-3}$
$G = -0.26878 \times 10^{-5}$
$I = 0.67593 \times 10^{-8}$
$K = 0.25080 \times 10^{-19}$

---

The aspherical surface (the second surface) included in the above numerical data is expressed by the following formula:

$$x = \frac{cs^2}{1 + \sqrt{1 - pc^2 s^2}} + Bs^2 + Es^4 + Fs^6 + Gs^8 + Hs^{10} + Is^{12} + Js^{14} + Ks^{16}$$

$$p = 1 - e^2, s^2 = y^2 + z^2, c = \frac{1}{r}$$

wherein the x axis is taken, the optical axis, the s axis is located on a plane perpendicular to the optical axis, the origin is taken as the intersection between the x axis and the aspherical surface, the reference symbols B, E, F, G, H, I, J and K denote the aspherical surface coefficients, the reference symbol p represents the conic constant and the reference symbol e designates eccentricity. Aberration characteristics of the imaging lens system having the numerical data listed above are illustrated in FIG. 2, wherein aberrations, especially chromatic aberration, are remarkable and the imaging lens system cannot form a favorable image with the white light. In order to correct the chromatic aberration, it is conceivable to use a GRIN lens in the imaging lens system. However, all the GRIN lenses conventionally used for correcting the chromatic aberration are radial GRIN lenses and there is known no axial GRIN lens which is used singly for correcting the chromatic aberration.

SUMMARY OF THE INVENTION

A primary object of the present invention is to provide an axial graded refractive index lens (axial GRIN lens) having a capability to correct aberrations, especially chromatic aberration.

Another object of the present invention is to provide lens systems using at least one axial GRIN lens having a capability to correct aberrations.

The graded refractive index lens according to the present invention is a meniscus lens having refractive index distribution in the direction along the optical axis and so designed as to satisfy the following conditions (1) and (2):

$$-1.5 < (f_p \nu_p + f_n \nu_n)/(\nu_p + \nu_n)d < 4.5 \quad (1)$$

$$|f_p/f_n| > 0.6 \quad (2)$$

wherein the reference symbol $f_p$ represents an inverse number of the power at the vertex of the convex surface of the GRIN lens accordig to the present invention, the reference symbol $f_n$ designates an inverse number of the power at the vertex of the concave surface of said GRIN lens, the reference symbol $\gamma_p$ denotes Abbe's number at the vertex of the covnex surface of said GRIN lens, the reference symbol $\gamma_n$ denotes Abbe's number at the vertex of the concave surface of said GRIN lens and the reference symbol d represents thickness of said GRIN lens.

The condition (1) is required for correcting especially chromatic aberration by the meniscus-shaped GRIN lens according to the present invention. If the upper or lower limit of the condition (1) is exceeded, chromatic aberration will be overcorrected when the meniscus-shaped GRIN lens is used singly. When said GRIN lens is used in combination with a homogeneous lens component, exceeding of the upper or lower limit of the condition (1) will make it impossible to correct the chromatic aberration with good balance.

The condition (2) is required for correcting the chromatic aberration, curvature of field and so on. If the lower limit of the condition (2) is exceeded, balance will be degraded between the powers of the convex surface and the concave surface of the meniscus-shaped GRIN lens, thereby aggravating not only the chromatic aberration but also the other aberrations, especially curvature of field, on the positive side, and making it difficult to correct the aberrations.

The meniscus-shaped GRIN lens according to the present invention can have a sufficient capability for correcting the chromatic aberration when said lens is so designed as to satisfy the following conditions (3) through (5):

(3) $\gamma_p - \gamma_n > 7$ (4) $\gamma_p < 100$
(5) $\gamma_n > 20$

The condition (3) defines a difference $\Delta\gamma$ between the Abbe's number $\gamma_p$ at the vertex of the convex surface and the Abbe's number $\gamma_n$ at the vertex of the concave surface of the GRIN lens. If the difference $\Delta\gamma$ exceeds the range defined by the condition (3), the capability for correcting the chromatic aberration will be insufficient.

The condition (4) and the condition (5) have been adopted from the viewpoints of the restriction imposed on the optical materials such as glass and polymers. The convex surface having a large Abbe's number must satisfy the condition (4), whereas the concave surface having a small Abbe's number must satisfy the condition (5). If the condition (4) or (5) is not satisfied, it will be impossible to obtain an adequate optical material.

In addition, it is possible to obtain an axial GRIN lens which has a capability to correct the chromatic aberration, curvature of field and other aberrations, and is practically manufacturable by designing the meniscus-shaped GRIN lens so as to satisfy not only the above-mentioned conditions (2) and (3) but also the following condition (6) which is obtained by modifying the condition (3) so as to have an upper limit:

(6) $50 > \gamma_p - \gamma_n$

It is preferable for correction of the aberrations to reserve a large difference $\Delta\gamma$ between the Abbe's number $\gamma_p$ at the vertex of the convex surface and the Abbe's number $\gamma_n$ at the vertex of the concave surface of the GRIN lens. However, too large a value of $\Delta\gamma$ is undesirable since such a value will produce defects from the viewpoints of manufacturing, etc. of the GRIN lens.

The GRIN lens according to the present invention is usable not only as an independent lens, needless to say, but also as a lens element adopted in a lens system for favorably correcting aberrations, especially the chromatic aberration, in the lens system by utilizing the aberration correcting capability of the GRIN lens.

BRIEF DESCRIPTION OF THE DRAWINGS

FIG. 1 shows a sectional view illustrating the conventional meniscus lens;

FIG. 2 shows curves illustrating the aberration characteristics of the conventional meniscus lens;

FIG. 3 through FIG. 6 show sectional views illustrating Embodiments 1 through 4 of the present invention;

FIG. 7 and FIG. 8 show curves illustrating aberration characteristics of the Embodiments 1 and 2 respectively of the present invention;

DETAILED DESCRIPTION OF THE PREFERRED EMBODIMENTS

Figure 4:
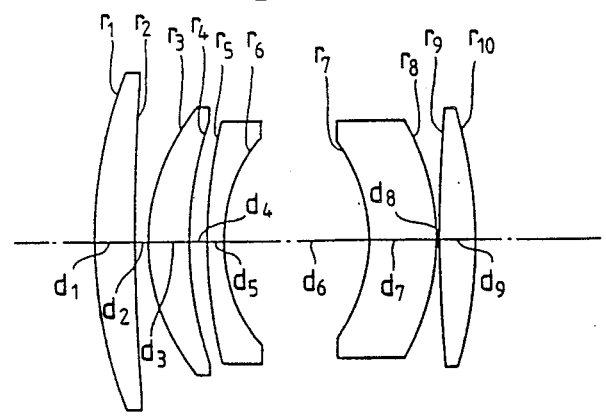

Now, the present invention will be described more detailedly below with reference to the preferred embodiments of the graded refractive index lens and lens systems using the graded refractive index lens illustrated in the accompanying drawings and given in the form of the following numerical data:

EMBODIMENT 1

$f = 35$ mm, F/13.5

$r_1 = 6.1631$
$\quad d_1 = 1.8493$ graded refractive index lens
$r_2 = 8.4369$
$\quad d_2 = 3.1281$
$r_3 = \infty$ (stop)

(graded refractive index lens)
d line $\quad N_0 = 1.49216$
$\quad\quad\quad N_1 = -0.4818 \times 10^{-3}$
$\quad\quad\quad N_2 = -0.3170 \times 10^{-2}$
C line $\quad N_0 = 1.48957$
$\quad\quad\quad N_1 = -0.3592 \times 10^{-3}$
$\quad\quad\quad N_2 = -0.3696 \times 10^{-2}$
F line $\quad N_0 = 1.49813$
$\quad\quad\quad N_1 = -0.7639 \times 10^{-3}$
$\quad\quad\quad N_2 = -0.1957 \times 10^{-2}$ $N_0$ is value at intersection between first surface and optical axis. ($0 \leq X \leq 2.18$)
$(f_p\nu_p + f_n\nu_n)/(\nu_p + \nu_n)d = 0.616$
$|f_p/f_n| = 0.713, \nu_p = 57.50$
$\nu_n = 29.87, \Delta\nu = 27.63$

EMBODIMENT 2

$f = 50$ mm, F/1.8

$r_1 = 44.2431$
$\quad d_1 = 3.9775 \quad n_1 = 1.80610 \quad \nu_1 = 40.95$
$r_2 = 230.9705$
$\quad d_2 = 1.3800$
$r_3 = 20.8843$
$\quad d_3 = 3.7682 \quad n_2 = 1.80610 \quad \nu_2 = 40.95$
$r_4 = 35.3312$
$\quad d_4 = 1.8509$
$r_5 = 50.7078$
$\quad d_5 = 1.5447 \quad n_3 = 1.80518 \quad \nu_3 = 25.43$
$r_6 = 15.6581$
$\quad d_6 = 14.4626$
$r_7 = -15.6874$
$\quad d_7 = 6.6072$ graded refractive index lens
$r_8 = -22.3401$
$\quad d_8 = 0.1634$
$r_9 = 167.7696$
$\quad d_9 = 3.4774 \quad n_5 = 1.77250 \quad \nu_5 = 49.66$
$r_{10} = -43.9944$ (graded refractive index lens)
d line $N_0 = 1.69895$
$\quad\quad\quad N_1 = 0.1679 \times 10^{-1}$
$\quad\quad\quad N_2 = -0.7762 \times 10^{-5}$
C line $N_0 = 1.69142$
$\quad\quad\quad N_1 = 0.1696 \times 10^{-1}$
$\quad\quad\quad N_2 = -0.7762 \times 10^{-5}$
F line $N_0 = 1.71462$
$\quad\quad\quad N_1 = 0.1625 \times 10^{-1}$
$\quad\quad\quad N_2 = -0.7762 \times 10^{-5}$ $N_0$ is value at intersection between 9th surface and optical axis.
$3.50 \leq X \leq 6.61)$
$(f_p\nu_p + f_n\nu_n)/(\nu_p + \nu_n)d = 1.091$
$|f_p/f_n| = 1.229, \nu_p = 43.83$
$\nu_n = 30.13, \Delta\nu = 13.70$

EMBODIMENT 3

$f = 41.0 \sim 78.0$ mm, F/3.3 $\sim$ 5.3

$r_1 = 30.0823$
$\quad d_1 = 3.9834 \quad n_1 = 1.69680 \quad \nu_1 = 55.52$
$r_2 = 18.4813$
$\quad d_2 = 10.0000$
$r_3 = -70.2450$
$\quad d_3 = 1.500 \quad n_2 = 1.69680 \quad \nu_2 = 55.52$
$r_4 = -345.0079$
$\quad d_4 = 0.1000$
$r_5 = 23.8517$ -continued

| | | | |
|---|---|---|---|
| | $d_5 = 2.5000$ | $n_3 = 1.78472$ | $\nu_3 = 25.68$ |
| $r_6 = 27.3983$ | | | |
| | $d_6 = D_1$ (variable) | | |
| $r_7 = 21.6481$ | | | |
| | $d_7 = 3.7092$ | $n_4 = 1.65160$ | $\nu_4 = 58.67$ |
| $r_8 = -101.1020$ | | | |
| | $d_8 = 2.2674$ | | |
| $r_9 = 28.0000$ | | | |
| | $d_9 = 4.0000$ graded refractive index lens | | |
| $r_{10} = 32.0000$ | | | |
| | $d_{10} = 1.3000$ | | |
| $r_{11} = -43.3239$ | | | |
| | $d_{11} = 3.4969$ | $n_6 = 1.83400$ | $\nu_6 = 37.16$ |
| $r_{12} = 20.0152$ | | | |
| | $d_{12} = 1.8112$ | | |
| $r_{13} = 73.6961$ | | | |
| | $d_{13} = 2.1579$ | $n_7 = 1.72342$ | $\nu_7 = 38.03$ |
| $r_{14} = -31.7613$ | | | |
| | $d_{14} = D_2$ (variable) | | |
| $r_{15} = -15.4024$ | | | |
| | $d_{15} = 1.6337$ | $n_8 = 1.50137$ | $\nu_8 = 56.40$ |
| $r_{16} = -15.8664$ | | | |

(graded refractive index lens)

d line $N_0 = 1.69974$
$N_1 = -0.54275 \times 10^{-1}$
$N_2 = 0.36116 \times 10^{-4}$
C line $N_0 = 1.69303$
$N_1 = -0.54713 \times 10^{-1}$
$N_2 = -0.78837 \times 10^{-4}$
F line $N_0 = 1.70537$
$N_1 = -0.54781 \times 10^{-1}$
$N_2 = 0.49827 \times 10^{-3}$ $N_0$ is value at intersection between 10th surface and optical axis.

$\leq x \leq 4.68$
$(f_p\nu_p + f_n\nu_n)/(\nu_p + \nu_n)d = 2.414$
$|f_p/f_n| = 0.604, \nu_p = 56.71$
$\nu_n = 22.69, \Delta\nu = 34.02$

| f | 41.0 | 55.7 | 78.0 |
|---|---|---|---|
| $D_1$ | 27.677 | 12.552 | 0.500 |
| $D_2$ | 2.116 | 10.110 | 25.514 |

EMBODIMENT 4 f = 100.0 mm, F/2.0

| | | | |
|---|---|---|---|
| $r_1 = 71.3111$ | | | |
| | $d_1 = 7.1089$ | $n_1 = 1.61700$ | $\nu_1 = 62.79$ |
| $r_2 = 503.9016$ | | | |
| | $d_2 = 0.1100$ | | |
| $r_3 = 48.5555$ | | | |
| | $d_3 = 5.9547$ | $n_2 = 1.49700$ | $\nu_2 = 81.61$ |
| $r_4 = 108.1026$ | | | |
| | $d_4 = 0.4100$ | | |
| $r_5 = 38.6597$ | | | |
| | $d_5 = 11.7056$ | $n_3 = 1.64250$ | $\nu_3 = 58.37$ |
| $r_6 = 42.6247$ | | | |
| | $d_6 = 3.9061$ | | |
| $r_7 = 72.8261$ | | | |
| | $d_7 = 2.3045$ | $n_4 = 1.76182$ | $\nu_4 = 26.52$ |
| $r_8 = 23.5483$ | | | |
| | $d_8 = 20.7454$ | | |
| $r_9 = -30.0960$ | | | |
| | $d_9 = 12.1049$ graded refractive index lens | | |
| $r_{10} = -49.5372$ | | | |
| | $d_{10} = 0.6000$ | | |
| $r_{11} = 176.5474$ | | | |
| | $d_{11} = 6.0637$ | $n_6 = 1.69680$ | $\nu_6 = 55.52$ |
| $r_{12} = -72.0034$ | | | |

(graded refractive index lens)

d line $N_0 = 1.58144$
$N_1 = 0.11512 \times 10^{-1}$
C line $N_0 = 1.57722$
$N_1 = 0.11498 \times 10^{-1}$
F line $N_0 = 1.59149$
$N_1 = 0.11548 \times 10^{-1}$ $N_0$ is value at intersection between 10th surface and optical axis.

$(-2.54 \leq x \leq 12.10)$

-continued $(f_p\nu_p + f_n\nu_n)/(\nu_p + \nu_n)d = 1.114$
$|f_p/f_n| = 1.315, \nu_p = 48.47$
$\nu_n = 40.75, \Delta\nu = 7.72$ wherein the refrence symbols $r_1, r_2, \ldots$ represent radii of curvature on the surfaces of the respective lenses, the reference symbols $d_1, d_2$, designate thicknesses of the respective lenses and airspaces reserved therebetween, the reference symbols $n_1, n_2, \ldots$ denote refractive indices of the respective lenses, and the reference symbols $\gamma_1, \gamma_2, \ldots$ represent Abbe's number of the respective lenses.

Refractive index distribution of the graded refractive index lens according to the present invention used in these embodiments is expressed by the following formula $$n(x) = N_0 + N_1 x + N_2 x^2$$

wherein the reference symbol x represents distance as measured from the vertex of the lens surface in the direction along the optical axis, and the reference symbols $N_0$, $N_1$ and $N_2$ designate the refractive index distribution coefficients.

In the numerical data, x has a range from a point of x=0 to both the surfaces of the graded refractive lens, regarding the surface on the concave side as being located on the interpolation line between marginal portions of the GRIN lens.

The Embodiment 1 is a single lens having the shape illustrated in FIG. 3.

The Embodiment 2 is the photographic lens system illustrated in FIG. 4 wherein the fourth lens element ($r_7$, $r_8$) is designed as the meniscus-shaped GRIN lens.

Figure 5:
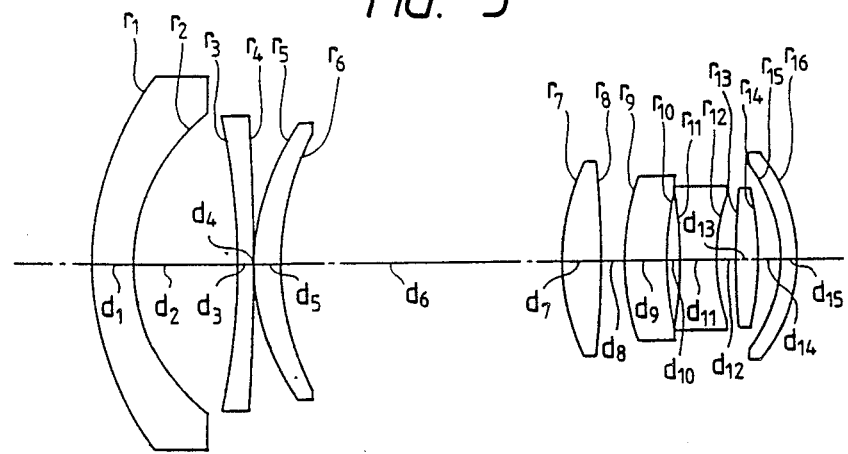
Figure 9:
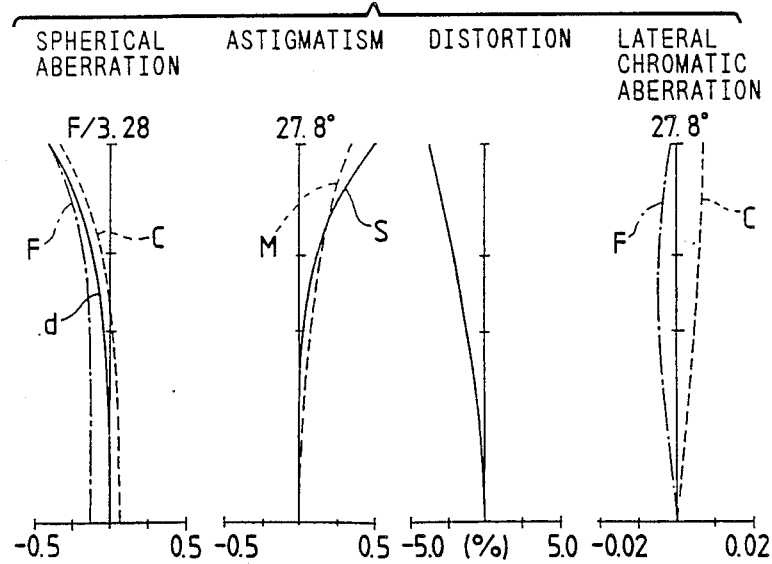
FIG. 9 through FIG. 11 show graphs illustrating aberration characteristics of the Embodiment 3 of the present invention.
Figure 10:
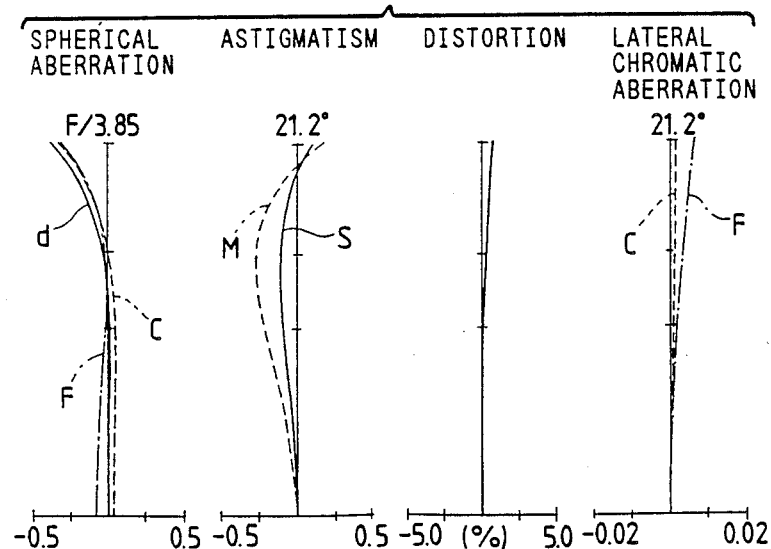
Figure 11:
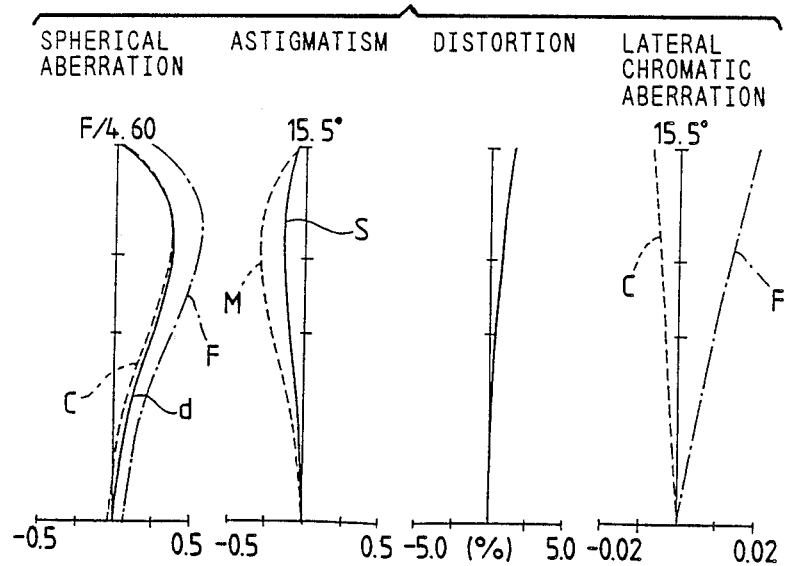
Figure 12:
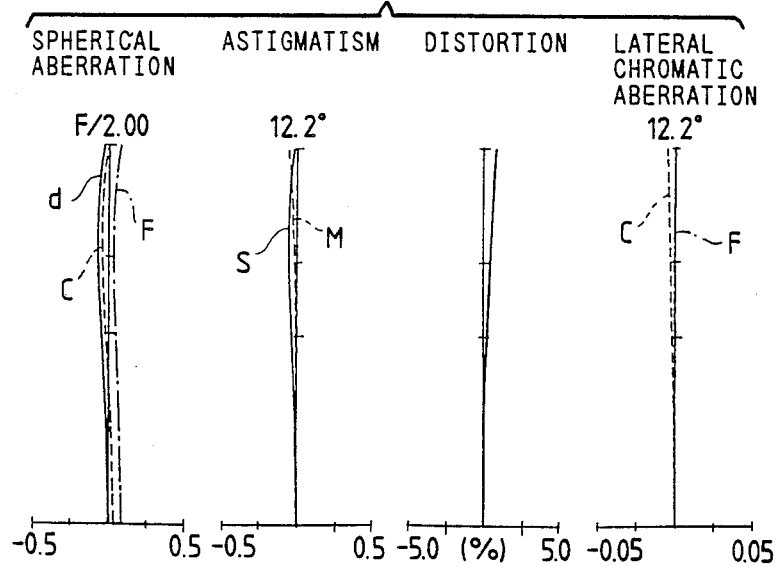
FIG. 12 shows graphs illustrating aberration characteristics of the Embodiment 4 of the present invention.

The Embodiment 3 is a zoom lens system having the composition shown in FIG. 5 and consisting of three lens units. In the Embodiment 3, the fifth lens component ($r_9$, $r_{10}$) is designed as the meniscus-shaped GRIN lens. Aberration characteristics at the wide position, intermediate focal length and tele position of the Embodiment 3 are visualized in FIG. 9, FIG. 10 and FIG. 11 respectively.

Figure 6:
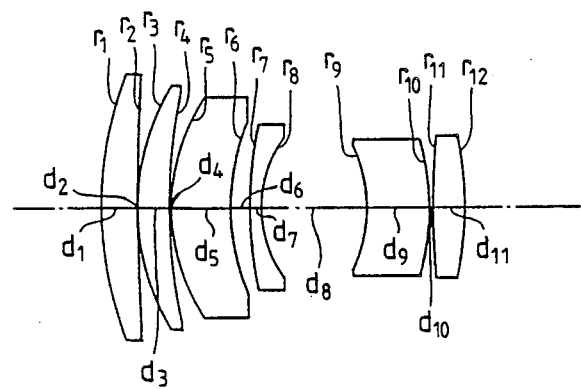

The Embodiment 4 is a photographic lens system illustrated in FIG. 6 wherein the fifth lens component ($r_9$, $r_{10}$) is designed as the meniscus-shaped GRIN lens.

The graded refractive index lens according to the present invention has refractive index distribution in the direction along the optical axis, a capability to correct aberrations, especially chromatic aberration, obtained by designing the lens so as to have a meniscus shape, chromatic aberration favorably corrected in the lens proper when used independently, and is capable of correcting chromatic aberration favorably in lens systems when used as a lens element in lens systems.

I claim:

1. A graded refractive index lens having refractive index distribution in the direction along the optical axis, and so designed as to satisfy the following conditions (1) and (2):

(1) $-1.5 < (f_p\gamma_p + f_n\gamma_n)/(\gamma_p + \gamma_n)d < 4.5$
  (2) $|f_p/f_n| > 0.6$ wherein the reference symbol $f_p$ represents an inverse number of the power at the vertex of the convex surface of said lens, the reference symbol $f_n$ designates an inverse number of the power at the vertex of the concave surface of said lens, the reference symbol $\gamma_p$ denotes Abbe's number at the vertex of the convex surface of said lens, the reference symbol $\gamma_n$ represents Abbe's number at the vertex of the concave surface of said lens and the reference symbol d designates thickness of said lens.

2. A graded refractive index lens according to claim 1 further satisfying the following conditions (3) through (5):

(3) $\gamma_p - \gamma_n > 7$
(4) $\gamma_p < 100$
(5) $\gamma_n > 20$

3. A graded refractive index lens according to claim 2 further satisfying the following condition (6):

(6) $\gamma_p \gamma_n < 50$.

4. A graded refractive index lens having refractive index distribution in the direction along the optical axis, having a meniscus shape, and so designed as to satisfy the following conditions (3) through (5):

(3) $\gamma_p - \gamma_n > 7$
(4) $\gamma_p < 100$
(5) $\gamma_n > 20$ wherein the reference symbol $\gamma_p$ represent Abbe's number at the vertex of the convex surface of said lens and the reference symbol $\gamma_n$ designates Abbe's number at the vertex of the concave surface of said lens.

5. A graded refractive index lens having refractive index distribution in the direction along the optical axis, having a meniscus shape, and so designed as to satisfy the following conditions (2), (3) and (6):

(2) $f_p/f_n > 0.6$
(3) $\gamma_p - \gamma_n > 7$
(6) $50 > \gamma_p - \gamma_n$, wherein the refrence symbol $f_p$ represents an inverse number of the power at the vertex of the convex surface of said lens, the reference symbol $f_n$ designates an inverse number of the power at the vertex of the concave surface of said lens, the reference symbol $\gamma_p$ denotes Abbe's number at the vertex of the convex surface of said lens and the reference symbol $\gamma_n$ represents Abbe's number at the vertex of the concave surface of said lens.

* * * * *